March 29, 1966  G. FONDA-BONARDI  3,242,499

CONSTANT VOLUME JOINT

Filed Sept. 7, 1962  6 Sheets-Sheet 1

INVENTOR:
Giusto Fonda-Bonardi

Richard Jentner
Agent

March 29, 1966  G. FONDA-BONARDI  3,242,499
CONSTANT VOLUME JOINT

Filed Sept. 7, 1962  6 Sheets-Sheet 3

Fig. 8

INVENTOR:
Giusto Fonda-Bonardi

Agent

March 29, 1966     G. FONDA-BONARDI     3,242,499
CONSTANT VOLUME JOINT
Filed Sept. 7, 1962     6 Sheets-Sheet 5

INVENTOR:
Giusto Fonda-Bonardi

Agent

March 29, 1966  G. FONDA-BONARDI  3,242,499
CONSTANT VOLUME JOINT

Filed Sept. 7, 1962  6 Sheets-Sheet 6

INVENTOR.
Giusto Fonda-Bonardi

Agent

United States Patent Office 3,242,499
Patented Mar. 29, 1966

3,242,499
CONSTANT VOLUME JOINT
Giusto Fonda-Bonardi, Los Angeles, Calif., assignor to Litton Systems, Inc., Beverly Hills, Calif.
Filed Sept. 7, 1962, Ser. No. 222,000
6 Claims. (Cl. 2—2.1)

This invention relates to hollow flexible joints, such as tubular connections for pressurized conduits, and more particularly to joints for space suits accommodating articulations of the wearer, such as knee and hip joints.

Flexible hollow joints of this type frequently include a bellows type tubing section, as the flexible portion of the assembly. In its most common form, the bellows tubing is composed of either rubberized fabric or thin-walled metal tubing having undulated walls to provide a series of closely spaced convolutions. While bellows elements of the foregoing type operate satisfactorily in most applications, there are certain instances where the inherent characteristics of conventional bellows tubing may severely restrict its utility.

More specifically, it is known that an unrestrained bellows tubing will normally tend to elongate and straighten when subjected to a pressure differential such that the internal pressure exceeds the external pressure, and will thus present a force which opposes flexing of the bellows unit. This characteristic of bellows tubing is of little consequence when the bellows is employed where bending forces are high and the pressure difference is low, as in refueling vessels at sea. However, if the flexible conduit is to retain substantially complete flexibility over its bending range even when subjected to significant pressure differences, this requirement poses a problem when only comparatively small bending forces are available.

For example in space suits, the condition of unrestrained flexibility is of utmost importance in order to permit the wearer to move without additional forces required solely to overcome the inherent resistance of the suit to flexing.

As stated above, the force which tends to straighten a bellows section is operative in conventional bellows sections when the internal pressure exceeds the external pressure, due to the fact that a maximum volume is attained in a straight position. More generally, stable equilibrium is established in the center of the angular range of flexure, and an unrestrained bellows section tends to assume a position in the center of its angular range.

Referring now to the specific requirements in space suits, the suit portions accommodating the knee and hip joints can limit motion to one plane only but large deflection angles are desired. In addition to the necessity of providing a strong mechanical linkage to take up axial stresses due to internal pressure, it is desirable to maintain the volume encompassed by the bellows section substantially constant so that no resistance to bending is experienced by the wearer.

It has been found that, to a first approximation, the volume of a bellows section remains constant, to a degree sufficient for many purposes, when it is constrained to bending in a single plane and about one axis substantially perpendicularly intersecting the bellows centerline. As a result of this arrangement, it will be apparent that when the bellows is subjected to flexing forces, one half portion of the bellows experiences compression while the other half portion is subjected to expansion. The half portions are separated by a symmetry plane defined by the centerline of the bellows and the bending axis.

From a theoretical point of view, constant volume conditions would be fulfilled in a system including a bellows section constrained to bending about an axis through its centerline, provided the volume changes within the individual convolutions could be neglected. However, in practice the convolutions have a volume characteristic of their own, as discussed below in more detail. Improved constancy of volume is therefore obtained by introducing a second order correction compensating for the inconstancy resulting from the configuration of the convolutions.

In one broader aspect of the invention, improved volume constancy with second order corrections which is satisfactory in applications such as the joints in space suits, is obtained by constraining or limiting motion of the bellows section to flexure about two substantially parallel axes substantially perpendicularly intersecting the bellows centerline. As is discussed in more detail below, the desired second order correction may be achieved by providing two pivot axes, mechanized in practice by a bell crank type linkage connecting the end portions or flanges of the bellows section. This results in a practically constant volume hollow joint, connecting two hollow bodies. It will be understood that, in the case of a space suit leg, the two hollow bodies are the portion of the suit receiving the upper leg and lower leg of a wearer, and the bellows section accommodates the knee.

A further feature of the invention includes arrangements for maintaining separating ribs in their proper positions, such ribs being conventionally used for ensuring that the bellows section, suitably made of rubberized fabric, forms the convolutions at predetermined locations. Additional features relate to assemblies useful in hip joints for space suits, and more specifically, to arrangements for constraining the internal side of the hip joint of a space suit to motion equivalent to that obtained by the double pivot or bell crank connection at the external side. The problem may be understood by comparison with the case of the knee joint in which two bell cranks may be used. When a similar construction is considered for the hip joint, one of the bell cranks would have to be located within the human body, so that no pivoting mechanism can be placed at its location. In accordance with another feature of the invention, it has been determined that a track arrangement may be provided to give a motion equivalent to that of the second bell crank.

Accordingly, it is one of the principal objects of the present invention to provide a constant volume characteristic of bellows section during flexure, and to avoid any maximizing of volume when the bellows is subjected to flexure under a pressure differential between outside and inside atmospheres. Other objects include the provision of a second order correction for the volume change during flexure resulting from the presence of convolutions, and the improvement of space suit joints which encompass the knee, hip and other articulations of the wearer.

Attempts have been made in the prior art to overcome the problem, and one such prior art device is disclosed in U.S. Patent No. 2,886,066, S. Hansen, issued May 12, 1959, assigned to the assignee of the present invention. In this patent, it is suggested to force the additional bellows material to cuff or pleat over cylindrical members. In addition, a multiple gimbal type structure between the end flanges of the bellows unit precludes any change in length of the bellows, but imparts complete freedom to bending of the bellows about any axis. Since no volume change due to convolution action occurs, and the length of the bellows section remains constant, the total volume of the assembly remains constant, i.e. independent from flexure. However, the gimbal and reinforced bellows structure is more cumbersome and expensive than desirable for many purposes, and additional frictional forces in the mechanical linkages must be overcome when bending the bellows of U.S. Patent No. 2,886,066. In addition, the complex linkages are subject to failure under extreme adverse operating conditions.

In contrast to prior art arrangements of this type, the joint of the present invention provides a constant volume joint which is more reliable, and less complex and expensive.

The novel features which are believed to be characteristic of the invention, both as to its organization and method of construction and operation, together with further objects and advantages thereof, will be better understood from the following description considered in connection with the accompanying drawing in which illustrative embodiments of the invention are disclosed, by way of example. It is to be expressly understood, however, that the drawing is for the purpose of illustration and description only and does not constitute a limitation of the invention.

Figures 1, 2, 3, 4:
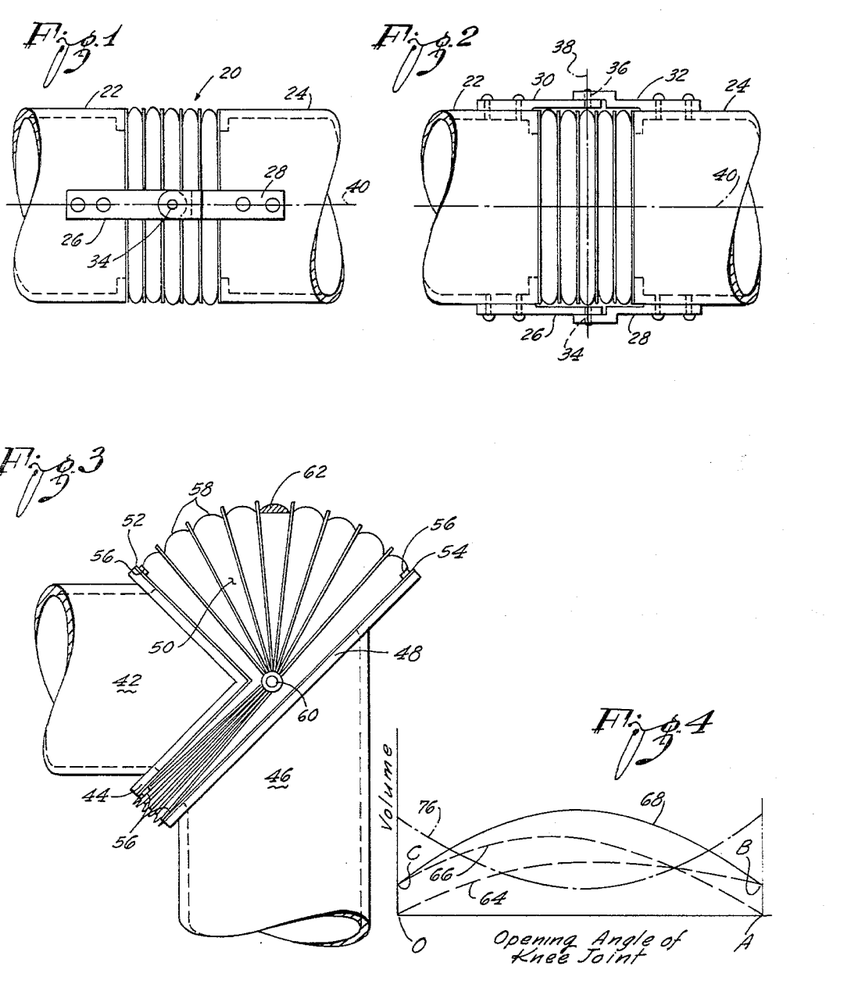
FIG. 1 is a schematic view of a hollow joint using a bellows section and a constraining mechanism providing first order volume correction in accordance with the invention.
FIG. 2 is a top view of FIG. 1.
FIG. 3 is a schematic view of a knee joint of a space suit in the bent position illustrating the contribution of the convolutions to the total volume of the assembly.
FIG. 4 is a diagram showing a plot of the volume in the bellows section of FIG. 3 as a function of the opening angle.

With reference to the drawings, FIGS. 1 and 2 schematically illustrate one of the basic principles of this invention. In the device of FIGS. 1 and 2, a bellows section 20, generally made of rubberized fabric and adapted to form convolutions, is to be used in an assembly in which the total volume is to remain constant to a first approximation during flexure. Though the nature of the assembly including the bellows section has no bearing on the principle, a pair of tubular elements 22 and 24 is shown in FIGS. 1 and 2, with the bellows section interconnecting the tubular elements. These elements may form part of a pressurized fuel pipeline, or they may form part of a space suit, as described in more detail in conjunction with other figures. The type of connection between tubes or pipes is of no importance in the present application, provided it is pressure-tight, and that the internal pressure within the hollow joint assembly results in a force tending to straighten it. When bending forces are applied, the bellows section 20 will resist to such forces and the purpose of imparting flexibility to the hollow joint by the use of a bellows section is partially frustrated by the opposing pressure differential force developed in the bellows section.

It has been found that the tubular flexible bellows section 20 of FIGS. 1 and 2 can be constrained in such a manner that the volume enclosed therein, and with it the total volume of the hollow joint assembly, remains sufficiently constant during flexure for numerous practical purposes. This is accomplished by the use of constraining elements which limit the bending flexibility about one axis substantially perpendicularly intersecting the bellows centerline. This construction method is illustrated in FIGS. 1 and 2. The constraining elements are represented by arms or brackets 26, 28, 30 and 32, secured to the tubular elements 22 and 24, as shown. The protruding ends of all four brackets have bores receiving pivots 34 and 36. It will be clear from FIGS. 1 and 2 that pivots 34 and 36 define an axis 38 perpendicularly intersecting the centerline 40 of the bellows section 20. The plane defined by pivot axis 38 and centerline 40 divides the bellows section into two half-portions. Since, upon applying a bending force to the assembly, relative motion of tubular elements 22 and 24, and therefore of the ends of the bellows section 20, is restricted to pivoting about axis 38, one half-portion of the bellows section experiences compression and the other half-portion experiences concurrent expansion. It can be seen that conjugate motion is involved because the angles determining the degree of compression and expansion are complementary angles. Therefore, during flexure the total volume remains constant, provided that the specific volume changes within the convolutions of the bellows section may be considered negligible.

Although the arrangement discussed to this point is satisfactory in numerous instances, a hollow joint for space suits represents an instance in which it is desirable to provide a second order correction which eliminates the comparatively small but still existing volume changes during flexure throughout the angular range of the joint attributable to volume changes within the convolutions of the bellows section.

Since space suits are specifically contemplated by this invention, the following discussion describes an embodiment of a space suit knee joint, illustrated in FIGURE 3, and discusses means for providing the second order correction mentioned in the preceding paragraph. The diagram of FIG. 4 demonstrates the volume of one of the convolutions of a bellows such as that of FIG. 3 as a function of the opening angle. The knee joint may include an upper leg portion assembly schematically illustrated by tubular portion 42 having one end angularly shaped to form a wedge, with a wedge-shaped flange 44 secured to the edge. The counterpart of the upper assembly is lower leg portion 46 with the one end cut along a slanted plane and also provided with a flange designated by reference numeral 48. The leg portions are interconnected by a tubular bellows section 50 forming convolutions 58. Peripheral annular flanges 52 and 54 secured to the flanges 44 and 48, respectively, by means of screws 56 may be used for pressure-tightly clamping the circular rims of the bellows to the flanges 44 and 48, respectively.

The following discussion assumes that upper leg portion 42 with flanges 44 and 52, and therefore the bellows section 50 with convolutions 58, is linked to the corresponding parts of the lower leg portion in such a manner that the relative motion of the upper and lower assemblies is restricted to swinging about pivot point or axis 60. Arms or brackets of the type shown in FIGS. 1 and 2 may be used, but have been omitted in FIG. 3 for the sake of simplification.

The second order volume errors introduced by the bellows convolutions will tend to keep the knee joint in the intermediate position if appropriate compensation is not made. The following discussion explains the reason for this. In the bent position of the knee joint, as illustrated, the upper half of each of the convolutions 58 is in the stretched, and the lower half of the convolutions is in the folded position. It can be seen that each of the stretched convolution portions occupies a volume represented by the cross sectional area 62. It will also be clear that during transition into the opposite relative position of the upper and lower leg portions, the area 62 increases to a maximum in the center of the angular pivot range and then decreases until the upper half convolutions are completely folded (as illustrated by the lower half-convolutions in FIG. 3). At the same time, the lower half-convolution volumes increase, pass through a maximum value and decrease toward a value corresponding to area 62. At this point it should be noted that the convolutions of a bellows section, even when completely open, are not entirely stretched. Were they entirely stretched, area 62 would have the value zero; however, the practically obtained end position defines a small but finite volume 62, as shown.

In order to still better demonstrate the relationship, FIG. 4 is a diagram showing the volume enclosed in any of the convolutions as a function of the opening angle of the knee joint. The abscissa represents the opening angle, with the knee being in the bent position indicated at the origin O. Accordingly, this is the position actually shown in FIG. 3, while the stretched position of the knee joint is indicated at point A of FIG. 4. In this stretched position, the upper half-convolutions would be compressed and the lower half expanded, so that tubular portions 42 and 46 would appear aligned with respect to one another. In FIG. 4, the broken line plot 64 represents the volume enclosed by the lower half-convolutions of FIG. 3. Their volume is zero when the joint is in the bent position of the wearer's knee, as illustrated in FIG. 3. With the wearer's knee stretched, these lower half-convolutions would be stretched and each then encloses a volume represented by area 62. This condition is that represented at the right-hand side of FIG. 4, and the distance from point A to point B represents the area 62 volume. The volume enclosed by the upper half-convolutions is plotted as broken curve 66, with the distance O–C indicating the volume 62 in the stretched joint position. This curve shows a volume of zero at point A, corresponding to the bent knee joint position. Inspection of plots 64 and 66 reveals that a volume maximum exists in the center range of opening angles. Of necessity the sum of curves 64 and 66, represented as plot 68 in FIG. 4, must also have a maximum in the center range. This is the cause for the tendency of the assembly to assume an intermediate position at which the enclosed volume is a maximum when the internal pressure exceeds the external pressure. In practice, this tendency is experienced by the wearer as a force maintaining his knee in the intermediate position.

It was found that this shortcoming of hollow flexible joint assemblies, which is due to the bellows convolution volume characteristic, may be overcome by constraining the bellows section ends and the hollow elements to which they are connected, to pivoting about a pair of substantially parallel axes which perpendicularly intersect the bellows centerline. This constraining mechanism corrects for the error introduced by the bellows convolutions as illustrated by curve 68 in FIG. 4. The ideal curve of volume vs. opening angle would be a straight line parallel to the opening angle axis. This would represent constant volume for any opening angle. Thus there would be no volume maximum tending to keep the knee joint in a certain position. The convolutions curve is a center peaked curve rather than a straight line. It has been discovered that if the dual pivot constraining mechanism discussed in the preceding paragraph is used that a curve of volume vs. opening angle with convolutions effects disregarded will produce a center dipped curve inverse to the convolutions curve. When a properly shaped constraining mechanism is chosen the combined characteristics of the dual axis constraining mechanism and the bellows convolutions provide a composite curve which is essentially a straight line representing constant volume.

Figure 5:
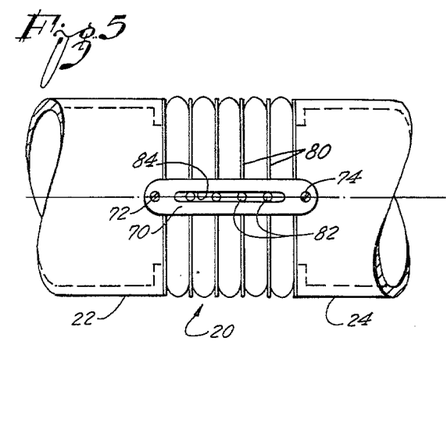
FIG. 5 is a schematic side view of a hollow joint using a double pivot type linkage as the constraining mechanism in accordance with the invention.

An improved arrangement of this type is schematically shown in FIG. 5. As in the embodiment of FIG. 1, the assembly may include a pair of hollow elements, such as tubular sections 22 and 24, interconnected by bellows section 20. The mechanism for constraining flexure of the bellows section 20 about two parallel axes, in one of the most simple forms, may include a pair of linkages, one shown and designated 70 in FIG. 5, pivotally mounted on tubular sections 22 and 24 at points 72 and 74. Pivot points 72 and 74, and the corresponding pivot points at the opposite side of the assembly, then define two parallel axes perpendicularly intersecting centerline 40 of the bellows section 20.

At this point, some discussion of volume-to-position relationship appears appropriate. Again disregarding the specific characteristic of the convolutions, it can be shown that the double pivot linkage exhibits a volume characteristic having maximum values at both ends of the angular range and a minimum in the center region. The nature of such characteristic is shown as plot 76 in FIG. 4. It can be shown that the curvature of characteristic 76 is a function of the distance between pivot 72 and pivot 74. If this characteristic curve 76 is added to the inverse curve representing volume of convolutions versus opening angle, a composite curve of volume versus angle of opening for the entire knee joint will be obtained. It is apparent that for a given convolution curve a length of distance between pivots can be chosen which will be given an inverse characteristic curve which will compensate for the drop-off in the convolution curve. This characteristic curve 76 added to the convolution curve will give a composite curve which is a straight line parallel to the opening angle axis and will represent a constant volume for any angle of opening of the knee joint.

With regard to the characteristics shown in FIG. 4, it is apparent that the height of the curve 68 is determined by the volume occupied by the convolutions of the bellows, and thus by the depth of the convolutions. Similarly, the curvature of the opposing characteristic 76 is determined by the separation of the two pivot points. Thus, the pivot points may be located on the flanges of the two hollow sections on either side of the bellows, or they may be mounted on extensions which protrude over the bellows, to any desired extent. In practice, the bellows is selected for the desired mechanical characteristics and the pivot points are subsequently selected to provide the characteristic 76 necessary to produce a substantially flat composite volume-versus-opening angle characteristic.

In the foregoing paragraphs, systems including one and two pivot axes have been considered. Although both systems were found satisfactory in space suits, for example, it is contemplated to use more than two substantially parallel pivot axes. All of these axes would extend substantially parallel with respect to a predetermined line which perpendicularly intersects the assembly centerline. Thus, all of these axes would form a family of substantially parallel lines, which lie in one plane when the centerline is a straight line (FIG. 1). With the joint in a bent position, as shown for example in FIG. 7, the family of pivot axes would occupy a curved surface which perpendicularly intersects the plane of the paper of FIG. 7 along the centerline 40.

Figure 6:
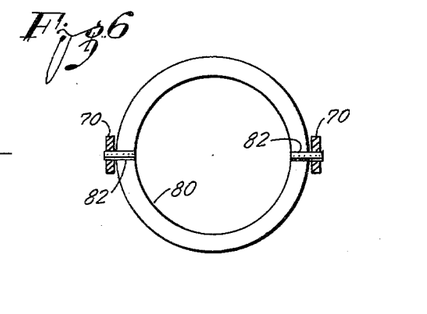
FIG. 6 is a detail view of one of the separating ribs of FIG. 5.

As one of the more practical considerations in mechanizing a hollow constant volume joint of any type, and more specifically a space suit joint, it was found appropriate to incorporate containing ribs into the assembly for separating, one from another, the individual convolutions of the bellows section. Such ribs are known to enhance proper bellows action. Further, they may be used in the presently discussed assembly for preventing radial displacement or bulging of the bellows section as a whole when it is flexed. FIG. 5 illustrates the principle of an arrangement suitable for this purpose, and FIG. 6 is a side view of the separating ribs of FIG. 5. As shown, annular ribs 80 are inserted between each pair of adjacent convolutions of bellows section 20. Each of the ribs is provided with a pair of oppositely arranged pegs 82, the pegs protruding into a slot 84 longitudinally extending along linkage 70. It will be seen that the pegs allow pivoting motion of the ribs about axes which are parallel with the primary axes through pivot points 72 and 74, and also maintain the rib pivot axes in a central position between points 72 and 74. Thereby, the ribs are constrained to follow the bellows action, and the convolutions are maintained in their proper shape.

Figure 7:
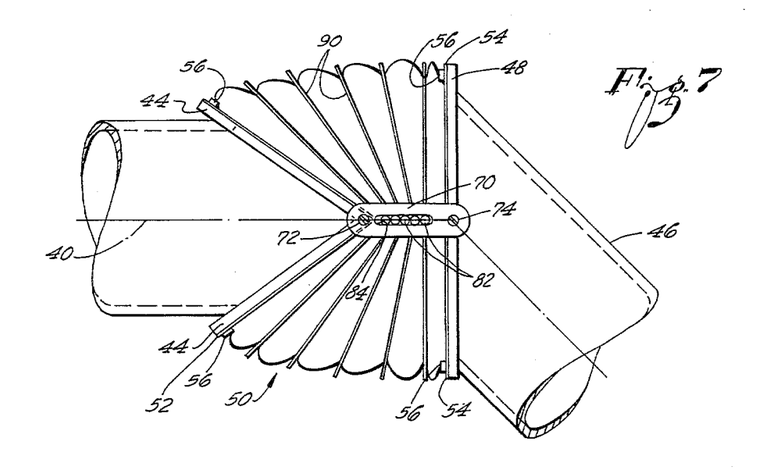
FIG. 7 is a schematic side view of a knee joint for space suits, illustrating the principles of the invention.

In further developing the underlying principles of the present invention for use in a knee joint assembly useful in a space suit, FIG. 7 illustrates, in a schematic side view, an embodiment which combines additional features with those of FIGS. 3 and 5. Each of the upper and lower leg sections 42 and 46 is provided with a flange 44 and 48, respectively, and the ends of bellows section 50 are secured to one and the other, respectively, using peripheral annular flanges 52 and 54 and screws 56, as described in connection with FIG. 3. In the realization of FIG. 7, the linkage 70 having a slot 84 for accommodating pegs 82 secured to the separating ribs may be identical with the corresponding element of FIG. 5. From a practical point of view it was found suitable to secure the linkage pivots 72 and 74 to the flanges 44 and 48, respectively. Thus, the pivot axis through pivot 72 coincides practically with the edge of the wedge-shaped or angular termination, and both pivot axes 72 and 74 lie within symmetry axes of the respective flanges.

Referring now to the ribs 90 of the joint shown in FIG. 7, this embodiment uses a set of ribs which are bent about an angle progressively increasing from the right-hand side to the left-hand side, from 180° to the wedge angle of the angular flange 44. In other words, the rib next to flange 48 is flat, the rib next to flange 44 is bent to match the angle of the flange, and all remaining ribs are bent to form intermediate angles between their upper and lower halves as shown. FIG. 7 shows the knee joint in an intermediate position where the two portions of the centerline 40 through the joint form an angle of about 135 angular degrees with one another, when in the position shown in FIG. 7, which position is the central position of the total angular range. It will be clear without further explanation that the specific shape of the bent ribs is in conformity with the bellows action in the particular case of a knee joint. For completeness, pegs 82 are shown to protrude into the slot 84 of linkage 70. It is of interest to note that the pins or pegs 82 defining the pivoting axes for the ribs are closer one to another in the arrangement shown in FIG. 7 as compared to that illustrated in FIGS. 1 and 2, or 5. While this fact is a natural consequence of the configuration of a space suit knee joint, due to the wedge shape of flange 44, it contributes to the efficiency with respect to volume constancy inasmuch as it assists in maintaining the axes defined by the pegs in positions where they intersect the bellows centerline in a comparatively narrow area. This further assists in constraining the bellows to a motion in which one half-portion experiences dilation in volume to the same extent that the other half is compressed. When the expanding and contracting incremental sections of the bellows joint both pivot about the same central points, and the one expands equally to the contraction of the other, it is clear that relatively good constancy of volume is maintained. This mode of operation is achieved, and symmetrical angular motion of the ribs and convolutions is mechanized, by concentrating the pivot axes in the narrow area between the flanges 44 and 48 of FIG. 7, for example. As a result, both the upper and lower half of the bellows operate by a fan type pivoting motion about mutually parallel, closely spaced axes through the bellows centerline.

Figure 8:
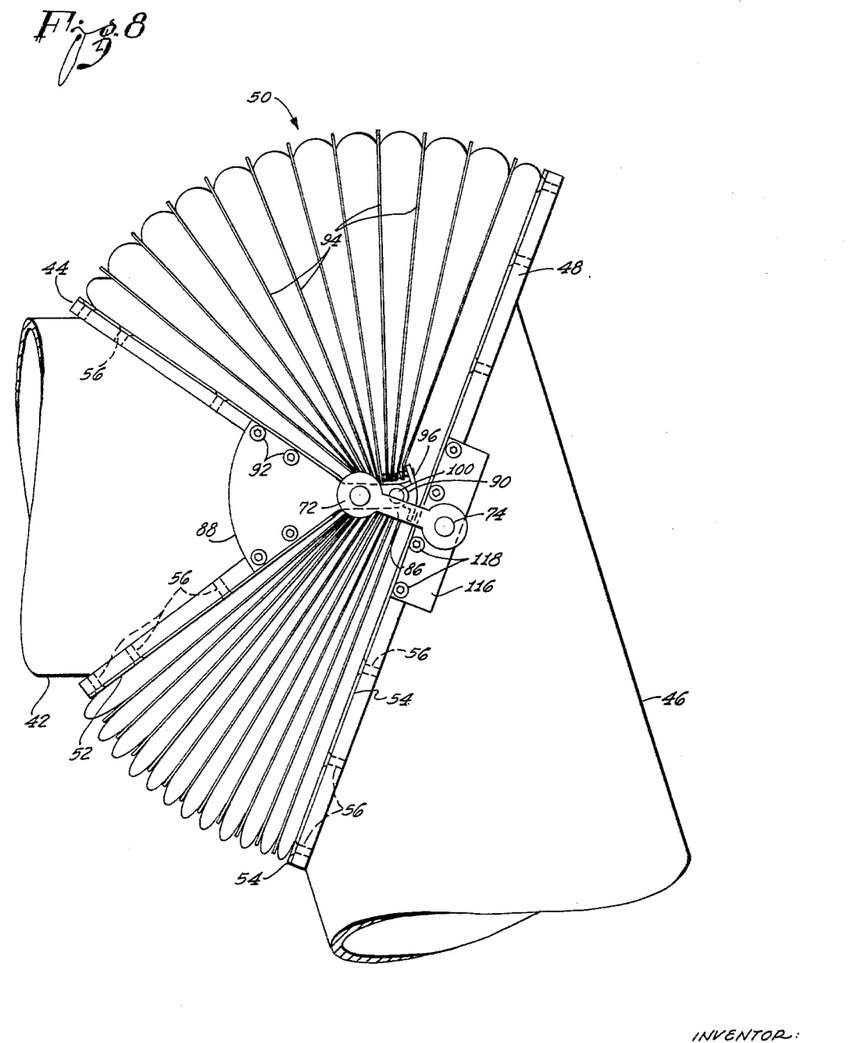
FIG. 8 is a side view of a space suit knee joint in accordance with the invention.
Figures 9, 10:
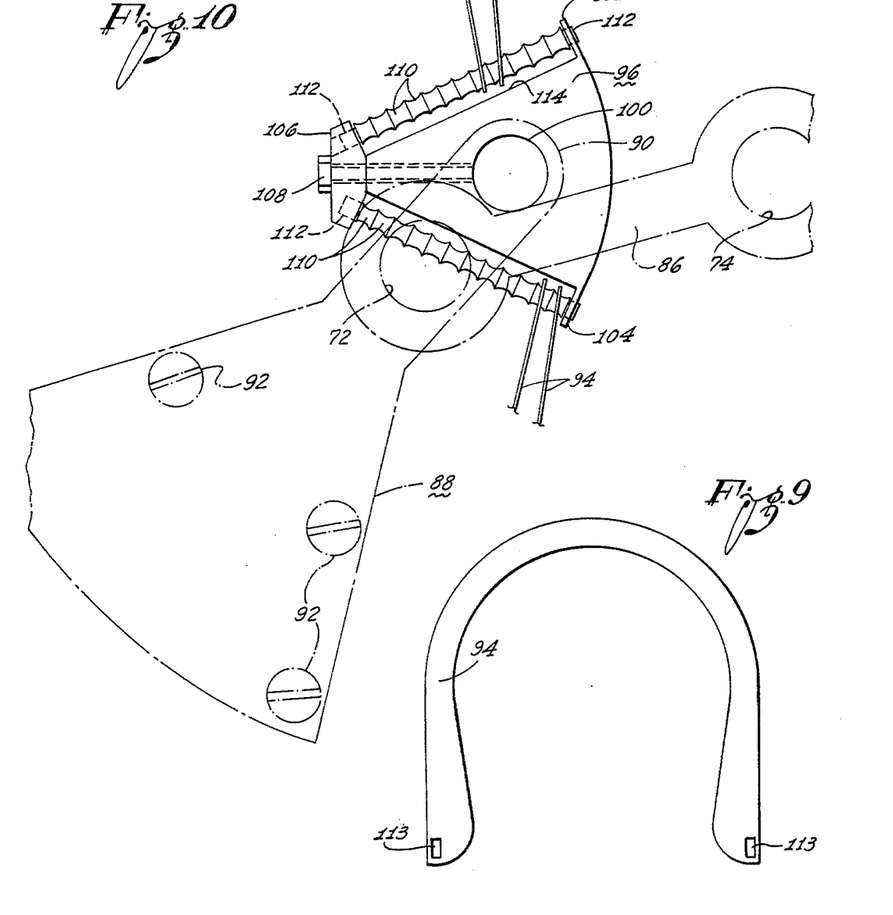
FIG. 9 is a plan view of the separating ribs of FIG. 8.
FIG. 10 is a detail view of FIG. 8 depicting the rib-pivot assembly.

A more detailed side view of a knee joint forming part of a space suit is given in FIG. 8. This assembly includes a more sophisticated anchoring mechanism for the ribs. One rib is shown in FIG. 9 and the essential elements of the rib anchoring mechanism are illustrated in FIG. 10.

Referring now to FIG. 8, the knee joint includes upper leg portion 42, terminating in the angular flange 44, lower leg portion 46 with the slanted termination in the form of flange 48, bellows section 50 interconnecting the flanges, and a bellcrank type linkage element 86 also interconnecting the flanges for constraining the freedom of relative motion of leg portions 42 and 46 and the bellows section, to bending about the pivots 72 and 74.

An identical assembly is mounted on the other side of the joint. The left-hand side end of the bellows section is clamped between the peripheral rim of flange 44 and the annular flange 52, by means of a number of screws 56, the flange 52 being bent around the wedge to match the shape of flange 44. In an analogous manner, a flat annular flange 54 is used for securing the other bellows section end to the slanted flange 48.

The double pivot assembly includes, at each side of the joint, a substantially triangular support plate 88 for the pivot 72 provided with a protrusion 90. Support plate 88 is rigidly secured to the edge of the bent portion of the slanted flange 44, using screws 92 as shown. In addition to supporting the pivot 72 for bellcrank 86, the protruding portion 90 of support plate 88 has pivotally mounted on it a hub assembly providing support and guidance for two sets of U-shaped separating ribs 94. FIG. 9 illustrates the shape of the ribs. FIG. 10 is a detail showing of the hub assembly as it is linked to support plate 88.

As shown in FIG. 10, the hub assembly includes an essentially trapezoidal plate 96 pivoted at location 100 to the protrusion 90 of support plate 88. The wider side of plate 96 continues into a pair of ears 102 and 104. A bracket 106 of the shape shown is secured to the narrow side of the trapezoidal plate 96 by means of a screw 108. Bracket 106 has two surfaces facing the ears 102 and 104, respectively, and is provided with openings, so that each opening faces another opening in one of the ears 102 and 104, respectively. The hub assembly is completed by a pair of pivot bars having a center portion composed of scalloped sections 110, with the ends 112 of the pivot bars fitting into the bores provided in the ears 102, 104 and in the bracket 106. As best seen from FIG. 9, each of the horseshoe-shaped ribs has an aperture 113 at each end, and when finally assembled, each scalloped section 110 of a pivot bar passes through the aperture 113 of one rib.

Thus a knee joint assembly will be seen to include one hub assembly at each of its sides with the upper set of ribs, referring to FIG. 8, pivotally engaging the upper pivot bars; and the lower set of ribs engaging the lower pivot bars. Scalloped sections 110, the apertures 113 in the ribs 94, and the clearance between the pivot bars 110 and the hub plate 96 are appropriately dimensioned so that the ribs may execute the pivoting motion required for proper bellows action, but are confined within the scalloped section in which they are mounted. This is accomplished by the fact that the edge 114 of plate 96 functions as a stop member for the rib ends facing it, and a similar statement is true for the lower set of ribs and the other edge of hub plate 96.

It should be noted that the assembly including the ribs and the pivoting and constraining elements described above are given as an example involving two sets of U-shaped ribs, all linked through hub plate 96 and support plate 88 to the upper leg portion 42. This arrangement is an example only, and many other arrangements may be designed for accomplishing the same result. By way of example, a structure similar to that shown in FIG. 7 may be used. Then, the bellcrank 86 would be provided with a slot accommodating pegs secured to the ribs. The ribs may be complete annular ribs of the type shown in FIG. 6, or they may be U-shaped to form two sets, as described in connection with FIG. 8.

The ribs of FIG. 8 are linked to upper leg portion 42, so that the linkage between bellcrank 86 and the lower leg portion 46 may be comparatively simply constructed.

As shown, it includes, at either side of the knee joint, a support plate 116 secured to the flange 48 by screws 118, and an accommodating pivot 74 for the other end of the bellcrank 86.

As a whole, the double pivot bellcrank linkage constrains the bellows section to the motion defined above. And the hub plate assembly retains the pivoting axes of each separating rib essentially adjacent and between the bellcrank pivot axes 72 and 74, so that both proper bellows action and constant volume requirements are fulfilled.

It will be apparent that the constant volume condition is equally important in connection with any of the joints forming part of a space suit, regardless which specific articulation of the human body is involved. The problem becomes particularly intricate when dealing with the hip joint. When considering one single hip joint, for example that of the left leg, as one functional unit, difficulty of design arises from the fact that, though one end of the joint pivot axis is located externally at the left hip side, the other end falls within the abdominal region of the human body. Of course a mechanical linkage cannot be placed within the human body. Thus a hip joint will have a different arrangement on each side of the leg. The outer side can utilize a standard double pivot as described above. However, since it is not possible to place such a pivot linkage in the internal crotch side of the leg, an equivalent of the double pivot linkage must be used.

In order to overcome this difficulty, the invention provides an arrangement for guiding the internal side of each of the upper leg portions of a space suit in such a manner that it is constrained, by appropriate guides following the crotch of the wearer, to execute a motion which is analogous to that resulting from the double pivot at the external side.

Figure 11:
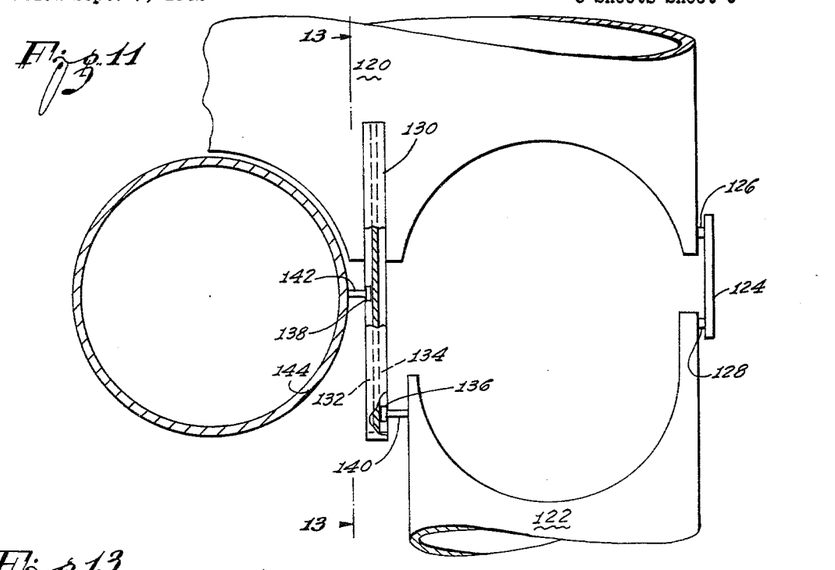
FIG. 11 is a schematic front view of a space suit left hip joint with the bellows section and separating ribs omitted.

In order to illustrate the nature of a guide structure suitable for the purpose, reference is made to FIG. 11 which is a schematic front view of a wearer's left-hand side portion of a space suit, with the bellows section, the separating ribs and all other structural details omitted for the sake of simplification. In FIG. 11, the abdominal portion 120 of the space suit is joined to the upper left leg portion by the external linkage 124 pivotally connected to the abdominal portion 120. The linkage may be of the nature discussed in connection with the knee joint, and a pair of pivot axes is schematically indicated in FIG. 11 at 126 and 128. It will be clear that linkage 124 is positioned at the left external side of the wearer's hip, because FIG. 11 is a front view, so that a wearer of the suit would face a viewer of the drawing.

Referring now to the structure for guiding the internal hip joint elements in the fashion contemplated by the invention, such guide structure may include a curved double track 130 following the crotch of the wearer and having its ends secured to the front and back sides of the abdominal suit portion 120. The front portion of the track 130 is shown in FIG. 11.

Figure 12:
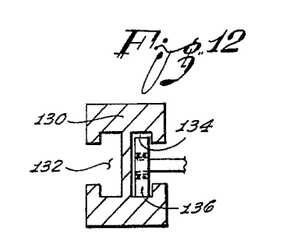
FIG. 12 is a cross sectional view of the roller track of FIG. 11.

As can be seen from FIG. 12, which is a cross sectional view of the track 130, it includes a pair of parallel channels 132 and 134, shaped to receive rollers or sliding elements. One such roller is shown in FIG. 12 and designated by numeral 136, while FIG. 11 also illustrates a second roller 138. Each of the rollers 136 and 138 is mounted to rotate about a pivot 140 and 142, respectively, and the pivots are shown anchored in the leg portions 122 and 144, respectively. As illustrated, the upper left leg portion 122 is in the stretched position, whereas it is assumed that the wearer has lifted his right knee to bend his right hip joint. This movement has brought the roller 138 into the front portion of the curved track 130, and the upper right leg portion 144 therefore appears in cross section.

Figure 13:
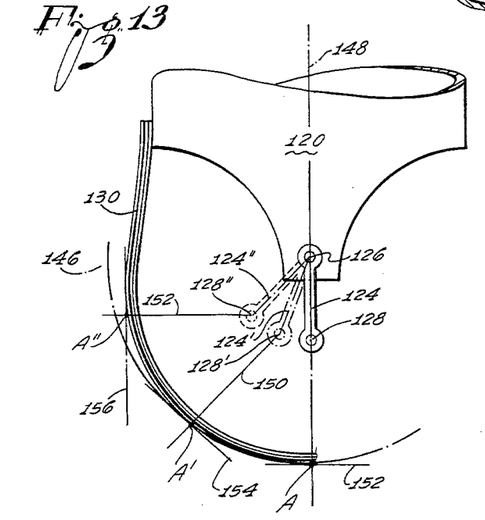
FIG. 13 is a diagram illustrating the geometrical considerations in determining a suitable shape of the roller track of FIG. 11.

At this point, it appears appropriate to discuss in some detail the curvature of the track, and the geometrical relationship involved in the design of the curve. Reference is made to FIG. 13 which schematically illustrates the trunk or abdominal suit portion 120 and the track 130 following the crotch line of the wearer from the front to the rear side of the abdominal portion 120. FIG. 13 is a schematic illustration of the geometrical relationship prevailing along the crotch and therefore taken along a vertical plane separating the leg portions. It should be noted that linkage 124 is drawn to an enlarged scale to facilitate the description. It is now assumed, still for the purpose of discussion, that the shape of the track approximates a half circle, as indicated by the broken line 146, having its center at the upper pivot point 126 of linkage 124. With rollers 136 and 138 (not shown) following the circular path 146, a single-pivot leg portion composed of the length from pivot 126 to point A would rotate about the pivot 126. Considering now the result obtained by providing the second pivot point 128, it can be seen that linkage 124 assumes positions in which it forms equal angles with the body center line 148 and the leg portion downward from the lower pivot point 128. Two such bent positions are shown in FIG. 13. Assuming that the wearer lifts his upper leg to an angle of 45 degrees, point A shifts to the position indicated at A'. Then, linkage 124 will assume the position 124' shown in broken lines. The line connecting pivot position 128' with A' is designated 150. It appears from FIG. 13 that linkage 124 and distance 150 form a broken line which must necessarily be shorter than the radius of circle 146 because this radius was assumed to be the straight-line distance from pivot 126 to point A. Consequently, point A' falls a very small distance within the circle 146. In an analogous manner, the position of point A" in FIG. 13 represents an angular position in which the wearer of the suit has lifted his upper leg by 90 degrees to assume a horizontal position. Then, broken line composed of distance 152 from A" to pivot position 128" and the linkage in position 124" forms greater angles and point A" is located even farther away from the circle 146 than point A'. It will be clear that points A, A', A", and the locus of other points established in the same fashion, determine the curvature of track 130 so that, if the linkage 124 is omitted and the leg portion is guided instead by rollers constrained to follow the track, the motion obtained is an equivalent to motion which would be achieved by the linkage. In geometrical terms, the involuted curve which can be inscribed to lines 152, 154 and 156 as tangents constitutes, in fact, the desirable shape of track curvature which constrains the motion of the leg portions to one which is equivalent to that obtained by the use of the double pivot linkage 124.

It has been stated above that FIGS. 11 and 13 are schematic illustrations of the constraining mechanism and the principles involved, with the bellows section, the separating ribs and structural details being omitted.

Figure 14:
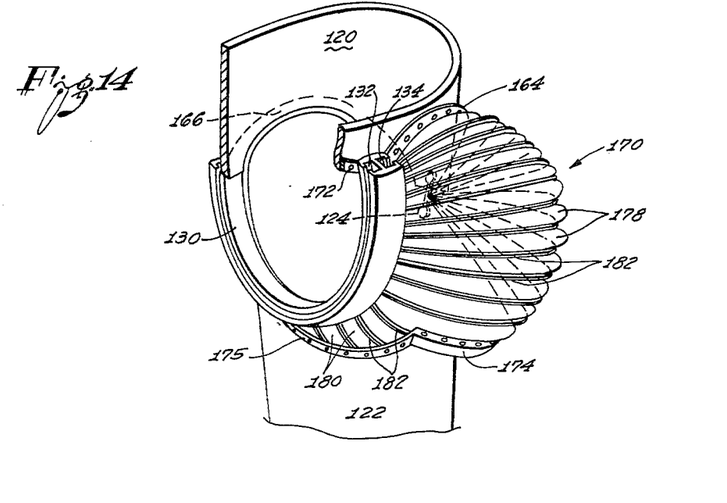
FIG. 14 is an isometric schematic fragmentary view of a model of the hip joint of FIG. 11.
Figure 15:
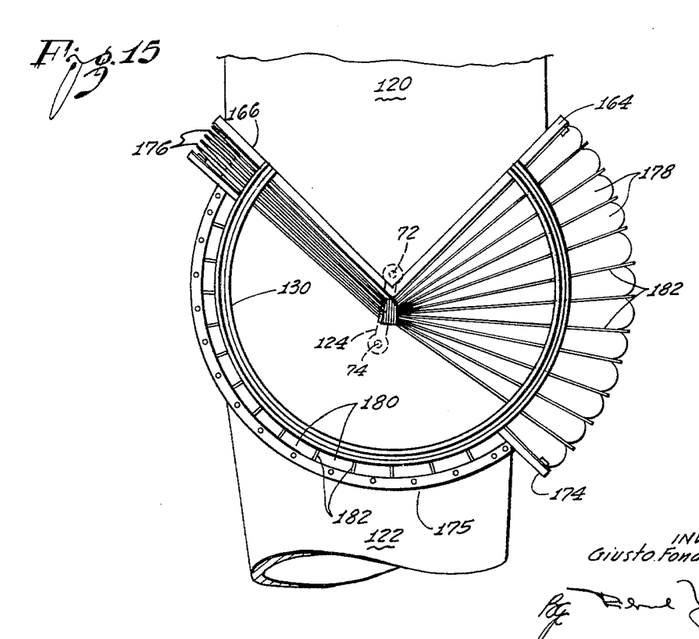
FIG. 15 is a schematic side view of FIG. 14.

In order to discuss now a more detailed realization of a space suit hip joint, FIG. 14 is an isometric fragmentary view of a hip joint model, and FIG. 15 is a side view of FIG. 14. Numeral 120 designates a portion of the abdominal suit portion provided with front flange 164 and rear flange 166 to which is connected the left half periphery of the upper end of the bellows section 170. It should be noted that in FIG. 14 the entire right-hand side of the assembly is omitted. The only portion shown is the wearer's left side, with the left leg portion 122 shown connected to the half of the abdominal section by the half of the bellows section 170. In practice, the omitted right side also includes a front and rear flange, so that all four upper flanges may receive the entire closed-line upper edge of the complete bellows section 170. A short length 172 of the right front flange is shown in FIG. 14 to indicate the continuity of the four flanges.

It is of interest to note that, in principle, the hip joint arrangement presently discussed constitutes a pair of joints of the type described in connection with a knee joint with both joints positioned adjacent one another and somewhat fused in the center or crotch region. Therefore, it will be clear that the pair of flanges 164, 166 forming an angle between one another is an equivalent to the angular termination of the upper knee portion of previously discussed figures. Similarly, the leg portion 122 is provided with a slanted upper end flange 174 finding its counterpart in flange 48 of FIG. 3 or 8, for example. However, in the crotch region flange 174 is reduced in size and secured to the internal upper edge of the leg portion 122. The reduced length of the flange is designated by reference numeral 175, and forms a hollow corner at 177, as shown in FIGS. 14 and 15.

Referring to the bellows section 170, it may be visualized as a pair of shorts formed by, for example, rubberized fabric of much greater area than is actually to be covered, and folded to form a multitude of pleats, which are the convolutions of the bellows. The analogy with the garment is helpful inasmuch as it can be seen that the bellows section has three openings. The upper, larger opening is secured to the abdominal section 120 along the four flanges including those shown and designated 164 and 166 in FIGS. 14 and 15. The lower two openings of bellows section 170, for the legs of the wearer, are secured to the leg portions, respectively, flange 174, 175 of the left leg portion illustrating this arrangement.

It can be seen that, in accordance with the anatomy of the human body, the hip joint bellows section 170 includes three groups of convolutions, which are those of the front, of the rear and of the crotch region. As illustrated, and in the position shown in FIGS. 14 and 15, the rear convolutions 176 are in the folded position. They start in the vicinity of linkage 124, continue between flanges 166 and 174, pass internally of track 130 and assume an analogous configuration in the omitted, right side portion of the assembly. Similarly, but in an unfolded position, because the hip joint is shown in the stretched position, the front convolutions 178 also start from the vicinity of linkage 124, form the open bellows area between flanges 164 and 174, also pass internally of track 130 and continue in an identical manner in the omitted right leg portion. Concerning the convolutions in the crotch section, it can be seen that this group designated by numeral 180 is considerably shorter, since the ends of the convolutions are secured to the leg portion 122 by means of the corresponding flange 175. Consequently, this group of convolutions does not continue toward the linkage 124. It will be understood that the arrangement is identical with respect to the omitted right leg portion of the suit.

Referring now to the separating ribs, and again discussing only the illustrated left leg portion, the ribs 182 also form three groups, as will be clear since the ribs separate, and therefore follow the convolutions. The external ends of the ribs extending along the front and rear convolutions terminate in vicinity, and are pivotally connected to linkage 124. The structural pivoting arrangement may be any of those shown in FIG. 7 or 8, for example. The group of ribs associated with the crotch region is shorter and has one end affixed to, or in vicinity of flange 175.

All of the internal rib ends terminate in rollers such as those shown in FIG. 11 and designated 136, 138, with the ribs of the left leg portion having the associated rollers accommodated in channel 134 of the track, and channel 132 receiving the rollers of the omitted right leg portion.

Comparison of FIG. 14 with FIG. 11 demonstrates that the separating ribs in the crotch region of FIG. 14, in fact, also assume the function of pivot axis 140 in FIG. 11. It will be remembered that, in FIG. 11, the bellows section and the separating ribs are omitted for the purpose of discussing the constraining action of the double pivot type motion produced by the track-roller assembly. In practice, the crotch region ribs, in addition to the separating action, form the connection between the internal upper region of the leg portion and the rollers guided in channel 134, as symbolized by pivot 140 in FIG. 11.

Summarizing the statements made hereinabove with respect to the motion constrained to pivoting about two generally parallel axes intersecting the bellows centerline, it will be clear that the external bellcrank type linkage 124, in cooperation with the internal track-roller assembly, constrains hip joint motion to one which fulfills this requirement. More particularly, and considering now again only one hip joint such as that including the left leg portion shown in FIG. 15, the bellows centerline essentially extends vertically through FIG. 15, with the pivoting axes perpendicularly intersecting the plane of the figure at pivot points 72 and 74.

It is to be understood that the above-described arrangements are illustrative of the application of the principles of the invention. Numerous other arrangements may be devised by those skilled in the art without departing from the spirit and scope of the invention. Thus, by way of example and not of limitation, a number of pivot axes greater than two may be found preferable to the single and double axes systems shown in the drawing. Differently designed mechanisms for pivotally mounting the flanges and the rib ends may be used, and, as a further example of contemplated modifications, the track-roller assembly in the hip joint may be replaced by another equivalent structure.

Accordingly, from the foregoing remarks, it is to be understood that the present invention is to be limited only by the spirit and scope of the appended claims.

What is claimed is:

1. In a space suit, a flexible joint assembly comprising:
   a pair of tubular elements,
   bellows means comprising a tubular section made of flexible material adapted to form convolutions interconnecting said tubular elements,
   a plurality of ribs arranged between said convolutions,
   pivot means comprising pivots mounted on each tubular element adjacent the end thereof, said pivots having axes which are parallel to each other,
   link means between said pivots for constraining the freedom of relative rotational motion of said tubular elements to pivoting motion about two substantially parallel axes substantially perpendicularly intersecting the centerline of said bellows section, and
   further means for constraining substantially all of the ribs to pivot about axes which axes extend through said link means, so that the rib pivoting axes also substantially perpendicularly intersect the centerline of said bellows section at fixed points,
   the distance between the two axes about which said elements are free to pivot, as determined by said link means, being substantially constant and so proportioned with respect to the shape and the dimensions of the bellows means that the volume within said bellows means remains constant with changes in relative angular position of said pair of tubular elements.

2. In a space suit, a constant volume joint comprising:
   two hollow rigid members,
   a bellows section including a number of convolutions interconnecting said rigid members,
   a plurality of separating elements, there being one element arranged between each of said convolutions and mounted to pivot about axes which axes extend through fixed points along the bellows centerline, whereby said bellows section has a predetermined characteristic of volume as a function of rotation of one of said rigid members relative to the other, in which the volume changes from a low value through a maximum to a low value with changes of the angle from one extreme position to the other, and
   constraining means including linkage means of predetermined substantially constant operative length pivotally secured to said two rigid members and extending along said bellows section for providing a volume versus angle characteristic which is complementary to said predetermined volume versus angle characteristic, the operative length of said linkage means being selected in such a manner that the volume of said bellows section is substantially constant with changes in relative angular position of said two rigid members.

3. In a space suit, a constant volume joint comprising: two hollow rigid members,
a bellows section having a number of convolutions interconnecting said rigid members,
means including a plurality of annular members extending alongside said bellows section, there being one member between each pair of adjacent convolutions, each of said annular members being mounted to pivot about an axis through a fixed point on the bellows centerline for confining said bellows section to have a predetermined characteristic of volume as a function of rotation of one of said rigid members relative to the other, in which the volume changes from a low value through a maximum to a low value with changes of the angle from one extreme position to the other, and
constraining means having two ends, each end being pivotally secured to one end of said two rigid members to define two parallel pivot axes at a predetermined substantially constant distance from one another, and extending along said bellows section for providing a volume versus angle characteristic which is complementary to said predetermined volume versus angle characteristic, said distance between the end pivots being selected in such a manner with respect to the shape and the dimensions of the bellows, that the volume remains constant regardless of changes in angle formed by said two hollow members.

4. In a space suit, a constant volume joint comprising: two hollow rigid members,
a bellows section having a number of convolutions interconnecting said rigid members,
means for constraining motion of said bellows section, said means including a plurality of annular members extending alongside said bellows section, there being one member between each pair of adjacent convolutions, each of said annular members being mounted to pivot about an axis through fixed points on the bellows centerline, and
link means of predetermined substantially constant length secured to each of said two rigid members and extending along said bellows section for constraining the freedom of relative motion of said rigid members to pivoting motion about two fixed, substantially parallel axes substantially perpendicularly intersecting the centerline of said bellows section,
said predetermined length being such that the volume remains constant regardless of changes in angle formed by said two hollow members.

5. In a space suit,
a pair of hollow assemblies for receiving portions of a wearer's body interconnected by an articulation, each of said assemblies having end pivots,
a tubular flexible bellows section having a plurality of convolutions for encompassing said articulation and having its ends secured to one and the other hollow assembly, respectively, and means for constraining the freedom of motion of said bellows, said means including a pair of linkage elements of predetermined constant length interconnecting said end pivots secured to said hollow assemblies and extending axially alongside said bellows section at opposite sides thereof, and a plurality of constraining ribs encompassing said bellows section and mounted on said linkage elements to pivot about axes which axes extend through fixed points along the bellows centerline between oppositely located points on said linkage elements,
the distance between the end pivots as determined by said length of the linkage elements being so proportioned with respect to the shape and the dimensions of the bellows section that the volume within the bellows section remains constant regardless of changes in angle formed by said two hollow assemblies.

6. In a space suit, a flexible knee joint assembly comprising:
hollow upper and lower leg portions, each having end pivots, one of said portions having an angular termination, the other of said portions having a slanted termination forming the complementary portion of a joint adapted for bending motion of a wearer's knee,
a tubular flexible bellows section having a plurality of convolutions for encompassing the wearer's knee and having its ends secured to said angular and slanted terminations, respectively,
a pair of rigid linkage elements of predetermined substantially constant length extending axially alongside at opposite sides of the wearer's knee, each linkage element interconnecting said end pivots on said upper and lower leg portions, and
a plurality of constraining ribs encompassing said bellows section, each rib being located between adjacent convolutions and pivotally mounted on each of said linkage elements, the pivot axes extending through fixed points along the bellows centerline between oppositely located points on said linkage elements,
the distance between the pivots interconnected by said linkage elements as determined by said constant length being so proportioned with respect to the shape and the dimensions of the bellows that the volume remains constant regardless of changes in angle formed by said upper and lower leg portions.

References Cited by the Examiner

UNITED STATES PATENTS

| | | | |
|---|---|---|---|
| 680,328 | 8/1901 | Henderson | 285—226 |
| 2,335,475 | 11/1943 | Beall | 2—2.1 X |
| 2,410,632 | 11/1946 | Colley et al. | 2—2.1 |
| 2,433,768 | 12/1947 | Krupp | 2—2.1 |
| 2,707,117 | 4/1955 | Fentress et al. | 285—226 |
| 2,939,148 | 6/1960 | Hart et al. | 2—2.1 |
| 2,954,562 | 10/1960 | Krupp | 2—2.1 |

FOREIGN PATENTS

| | | |
|---|---|---|
| 1,182,077 | 1/1959 | France. |
| 629,161 | 4/1936 | Germany. |

FRANK J. COHEN, *Primary Examiner.*

JORDAN FRANKLIN, DAVID J. WILLIAMOWSKY,
*Examiners.*

R. J. SCANLAN, *Assistant Examiner.*